US011531418B2

United States Patent
Halbach et al.

(10) Patent No.: US 11,531,418 B2
(45) Date of Patent: Dec. 20, 2022

(54) PHASED ARRAY ULTRASOUND DEVICE FOR CREATING A PRESSURE FOCUS POINT

(71) Applicant: IMEC VZW, Leuven (BE)

(72) Inventors: Alexandre Halbach, Nethen (BE); Veronique Rochus, Embourg (BE)

(73) Assignee: IMEC VZW, Leuven (BE)

( * ) Notice: Subject to any disclaimer, the term of this patent is extended or adjusted under 35 U.S.C. 154(b) by 0 days.

(21) Appl. No.: 17/104,844

(22) Filed: Nov. 25, 2020

(65) Prior Publication Data
US 2021/0165546 A1 Jun. 3, 2021

(30) Foreign Application Priority Data
Nov. 29, 2019 (EP) .................................... 19212564

(51) Int. Cl.
*G06F 3/041* (2006.01)
*G06F 3/01* (2006.01)
*G06F 3/043* (2006.01)
*H04M 1/02* (2006.01)

(52) U.S. Cl.
CPC .......... *G06F 3/04144* (2019.05); *G06F 3/016* (2013.01); *G06F 3/043* (2013.01); *H04M 1/026* (2013.01); *H04M 2201/38* (2013.01)

(58) Field of Classification Search
None
See application file for complete search history.

(56) References Cited

U.S. PATENT DOCUMENTS

| 2004/0160144 A1 | 8/2004 | Daft et al. |
| 2007/0228877 A1 | 10/2007 | Huang |
| 2015/0013462 A1 | 1/2015 | Takenaka et al. |

(Continued)

FOREIGN PATENT DOCUMENTS

KR 20160075019 A 6/2016

OTHER PUBLICATIONS

Extended European Search Report and Written Opinion, EP Application No. 19212564.9, dated Jun. 4, 2020, 12 pages.
(Continued)

*Primary Examiner* — Amare Mengistu
*Assistant Examiner* — Sarvesh J Nadkarni
(74) *Attorney, Agent, or Firm* — McDonnell Boehnen Hulbert & Berghoff LLP

(57) ABSTRACT

A phased array ultrasound device includes transducer elements arranged in a two dimensional array; first electrodes, each first electrode extending along a first direction; and second electrodes, each second electrode extending along a second direction, where each transducer element is associated with one first electrode and one second electrode, where each transducer element includes a material located between its associated first electrode and second electrode, and is configured to emit an ultrasonic wave induced by a vibration force or an oscillation force of its material when the transducer element is actuated based on control signals applied to its associated first electrode and second electrode, where each transducer element has a unipolar actuation force direction, and where the phased array ultrasound device is configured to create a pressure focus point by actuating a set of transducer elements to form a combined ultrasonic wave.

18 Claims, 12 Drawing Sheets

(56) References Cited

U.S. PATENT DOCUMENTS

| | | | |
|---|---|---|---|
| 2015/0165479 A1* | 6/2015 | Lasiter | G06F 3/0412 |
| | | | 310/322 |
| 2016/0107194 A1* | 4/2016 | Panchawagh | G01S 7/5208 |
| | | | 367/140 |
| 2016/0117541 A1 | 4/2016 | Lu et al. | |
| 2017/0205500 A1* | 7/2017 | Kiyose | G01S 15/894 |
| 2017/0320093 A1* | 11/2017 | Chatterjee | H01L 41/047 |
| 2020/0272255 A1* | 8/2020 | Panchawagh | G06F 3/0383 |

OTHER PUBLICATIONS

Tom Carter, Sue Ann Seah, Benjamin Long, Bruce Drinkwater, and Sriram Subramanian. 2013. UltraHaptics: multi-point mid-air haptic feedback for touch surfaces. In Proceedings of the 26th annual ACM symposium on User interface software and technology (UIST '13). Association for Computing Machinery, New York, NY, USA, 505-514. https://doi.org/10.1145/2501988.2502018.

* cited by examiner

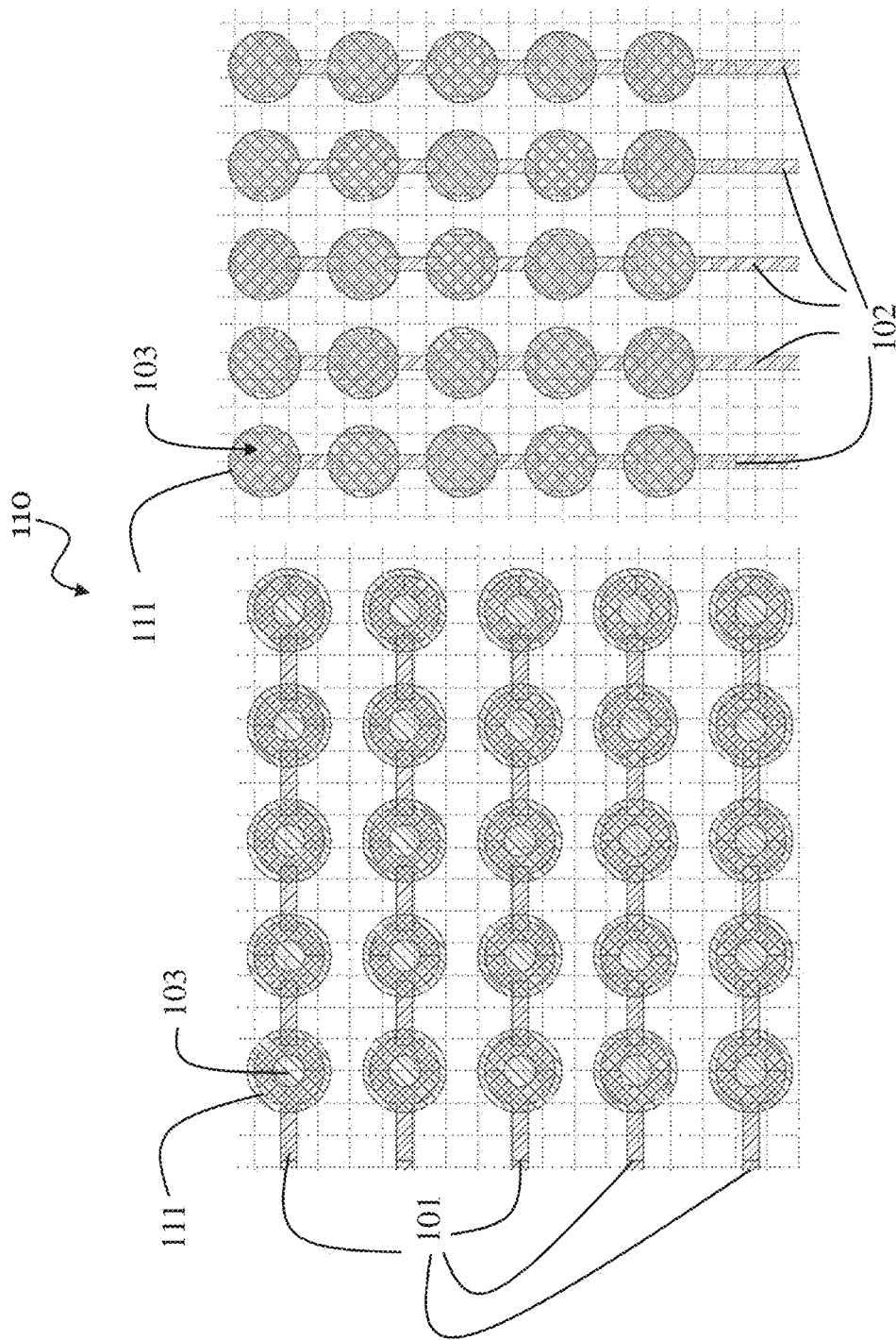

PHASED ARRAY ULTRASOUND DEVICE FOR CREATING A PRESSURE FOCUS POINT

CROSS-REFERENCE TO RELATED APPLICATIONS

The present application is a non-provisional patent application claiming priority to European Patent Application No. 19212564.9, filed Nov. 29, 2019, the contents of which are hereby incorporated by reference.

FIELD OF THE DISCLOSURE

The present disclosure relates to a phased array ultrasound device, and to an electronic device for emitting ultrasound. In particular, the disclosure relates to emitting ultrasonic waves to create a pressure focus point. The disclosure also relates to a method for operating a phased array ultrasound device. In particular, the phased array ultrasound device and the operating method are provided for two-dimensional (2D) pressure focus point steering of microscale ultrasonic transducer arrays with unipolar actuation force.

BACKGROUND

Conventional Micromachined Ultrasonic Transducers (MUTs) are micro-devices that have the capability to emit high-frequency ultrasound waves. FIG. 7 schematically illustrates a conventional piezoelectric MUT (PMUT) 70.

The conventional PMUT 70 comprises a mechanical membrane 71 positioned above a cavity (the cavity of the PMUT 70 comprises vacuum). The mechanical membrane 71 comprises two layers of different materials including the bottom layer 76 which is a polyimide membrane positioned directly above the cavity (vacuum) and the top layer 72 which is a piezoelectric material (Piezoelectric layer (PVDF) 72) and is sandwiched between two electrically actuated electrodes 73, 74, so that when a voltage is applied between the two electrodes 73, 74, the piezoelectric layer 72 senses an electric field. Because of its piezoelectric properties, the piezoelectric material, i.e., the piezoelectric layer (PVDF) 72, expands or contracts when it senses a positive or negative electric field. The conventional PMUT 70 is fabricated on a glass substrate 75.

When an alternating voltage is applied at the electrodes 73, 74, the piezoelectric layer 72 alternatively expands and contracts, which leads to a vibration of the whole membrane 71. This vibration of the membrane 71 creates acoustic pressure waves in a fluid above. The vibration frequency can range from a few tens of kilohertz to tens of megahertz. For example, when the above fluid is air, the conventional PMUT 70 may have a vibration frequency of 500 kilohertz.

When multiple MUTs are connected together in arrays, it may be become possible to focus the pressure to a focus point at a given elevation above the array. FIG. 8 is an image of an array 80 of fabricated PMUTs.

As an example of possible dimensions, the array (e.g., such as the array 80 illustrated in FIG. 8) can be 2 cm by 2 cm, and the pressure focus point can be formed about 1 cm above the center of the array.

Creating the pressure focus point can be done by combining the emitted acoustic pressure waves of all individual MUTs in the array. For instance, for a pressure focus point at 1 cm above the center of the array, the individual MUTs will generally have a harmonic vibration, which is more and more delayed as MUTs farther away from the array's center are considered. This is, because for MUTs that are located farther away from the center, the travelling distance of their acoustic pressure wave to the pressure focus point is longer than for MUTs that are just below the pressure focus point, i.e., that are close to the center of the array.

FIG. 9 illustrates the creation of a pressure focus point using MUTs. The pressure focus point is created based on appropriate delays of the individual MUT vibrations, such that the emitted acoustic pressure waves are focused to the focus point, at which the pressure is much larger than around it.

A pressure focus point can be used, for example, for haptic feedback, i.e., to give pressure feedback at a given position to a user of an electronic device, such as a smartphone, in order to provide a virtual object (smartphone buttons, etc.). For a 32 by 32 (32×32) MUT array, the delay will generally be applied to every individual MUT, to get the increased pressure at the focus point as shown in FIG. 10. The pressure focus point is about 1 cm above the center of the array, and the array size is 2 cm by 2 cm. The MUT diameter is about 500 µm. As it is expected, the delay increases when considering MUTs that are farther away from the center of the array.

Conventional phased array ultrasound devices and methods have the potential disadvantage that, in order to create the pressure focus point, the delay of a set of transducer elements needs to be controlled. For example, the delay of each individual transducer element in an array may be required to be controlled. This typically requires a wire connection for each transducer element. For larger arrays (for example, for 32×32 arrays or even larger arrays) this leads to a rather large numbers of connections (e.g., 32×32=1024 connections).

Moreover, a relatively complex circuitry can be required, which may increase the production cost of the conventional phase array ultrasound devices.

Although phased array ultrasound devices and methods of operating such devices exist, it is generally desired to have an improved and simpler device and method, e.g., for creating a pressure focus point for providing haptic feedback.

SUMMARY

In view of the above-mentioned potential disadvantages, embodiments of the present disclosure can potentially provide an improved phased array ultrasound device, an improved electronic device, and a method of operating the phased array ultrasound device.

FIG. 11A and FIG. 11B show schematic views of an arrangement of lower electrodes (FIG. 11A) and upper electrodes (FIG. 11B), respectively, of the example of the phased array ultrasound device 110.

In order to avoid a larger number of connections, as in the conventional devices, a plurality of lower electrodes 101 are electrically connected below the piezoelectric layer 103 of the membrane, and a plurality of upper electrodes 102 are electrically connected above the piezoelectric layer 103 of the membrane. In particular, the connections are such that only a number of wires might be required to actuate the array, wherein the number is equal to the number of rows plus the number of columns in the array. This corresponds to much fewer connections/wires (32+32=64, instead of 1024 in the conventional devices).

As it can be derived from FIG. 11A, each lower electrode 101 may connect a row of transducer elements 111 in a 2D array. Moreover, as it can be derived from FIG. 11B, each upper electrode 102 may connect a column of transducer elements 111 in the 2D array.

In other words, the lower electrode 101 of all individual transducer elements 111 in a same row of the array is connected together as illustrated in FIG. 11A (the upper electrodes 102 have been removed for clarity in the illustration). Moreover, the upper electrode 102 of all individual transducer elements 111 in a same column of the array is connected together as illustrated in FIG. 11B (the lower electrodes 101 have been removed for clarity in the illustration).

With the arrangement of the connections described based on FIG. 11A and FIG. 11B, the example of the phased array ultrasound device 110 may be configured to move the pressure focus point in any direction along the array, by just energizing another set of rows and columns of transducer elements 111.

For example, the phased array ultrasound device 110 may actuate the array to create a pressure focus point based on electrically actuating the rows and columns of the transducer elements 111, so that the central column and the central row (central meaning that it passes right below the pressure focus point) have a phase delay, such that the corresponding transducer elements 111 are actuated with a delay (e.g., an optimal delay) to focus onto the pressure focus point.

The delay may be, for example, identical to the "1D" focusing delay, i.e., the delay that would be applied to each transducer element 111 in the row or column, if there was a single row or column. All transducer elements 111 that are not on the central row and column generally do not have the same delay, but managing to still get a close to optimal delay everywhere is potentially advantageous.

Next a mathematical description is provided. For example, it may be assumed that the transducer elements 111 driven in the row-column (the procedure described above) are driven by an actuation voltage that is equal to the difference of the corresponding row-voltage and column-voltage (both voltages are referenced to a common ground electric potential).

If the transducer element 111 in a given row R, and a given column C is actuated with row-voltage $V_R = V_0 \sin(2\pi f_0 t + \phi_R)$ and the column-voltage $V_C = V_0 \sin(2\pi f_0 t + \phi_C)$ then the transducer element 111 actuation voltage can be determined according to Eq. (1):

$$V_{MUT} = V_R - V_C = V_0\sin(2\pi f_0 t + \phi_R) - V_0\sin(2\pi f_0 t + \phi_C) = \quad \text{Eq. (1)}$$
$$2V_0\cos\left(2\pi f_0 t + \frac{1}{2}(\phi_R + \phi_C)\right) \cdot \sin\left(\frac{1}{2}(\phi_R - \phi_C)\right).$$

Furthermore, since the transducer element 111 in the center of the array has a reference actuation phase 0, the row phases $\phi_R$ typically required to have the central column actuated in an optimal way can be taken such that the transducer element 111 delay $$\frac{1}{2}(\phi_R - \phi_C)$$

on the central column $$\left(\text{i.e., } \frac{1}{2}(\phi_R + 0) = \frac{1}{2}\phi_R\right)$$

gives the optimal 1D focus-delay.

Furthermore, the row driving voltage delays may be selected equal to $2\phi_R$, where $\phi_R$ is the optimal delay for a 1D row focusing. Similarly for the columns it may be possible to use a column driving voltage delay equal to $2\phi_C$, where $\phi_C$ is the optimal delay for a 1D column focusing (identical to the delay for the 1D row focusing if the focus is above the center of a square array).

Note that the peak actuation voltage sensed by each transducer element 111 in the row-column driving scheme described above depends on the position in the array due to the factor of $$\sin\left(\frac{1}{2}(\phi_R - \phi_C)\right).$$

Reference is now made to FIG. 12A and FIG. 12B, which show a diagram illustrating a force across PMUTs of the transducer elements 111 in an array for forming a desired combined ultrasound wave (FIG. 12A), and a diagram illustrating differences between phase delays (FIG. 12B).

The peak driving voltage of each PMUT in a 36×36 array focusing in air at 1 cm above the array (array pitch is 600 um, resonance frequency of the PMUTs is 500 kHz) is illustrated as a relative fraction of the driving voltage $V_0$. Moreover, some of the PMUTs see $2V_0$, the double of the peak electric actuation voltage (due to the differential driving approach).

Additionally, with the driving method described above, each PMUT in the 36×36 PMUT array (of the phased array ultrasound device 110) sees an actuation delay that is illustrated on the FIG. 12B.

Although this actuation technique requires much less wire connections to the outside, it comes with a potential (severe) drawback. In particular, 180 degrees jumps can appear at many locations in the array. These jumps can dramatically lower the pressure available at the pressure focus point, since a 180 degree error corresponds to a negative pressure contribution at the focus point. The jumps also make it more complicated to reliably create a haptic pressure pattern with such a driving scheme.

One way to alleviate this issue is, for example, to add an extra transistors below each transducer element 111, in order to have the possibility to flip the applied voltage. However, this method generally increases the complexity and possibly the production cost of the phase array ultrasound apparatus.

A potential benefit of the present disclosure is thus further to provide an improved array of transducer elements for an improved phased array ultrasound device, in which the array of the transducer elements is able to create an improved pressure focus point. In particular, a number of connections could be reduced in comparison to the conventional devices. At the same time, a phase delay map of the phased array ultrasound device, according to embodiments of the disclosure, could be improved without using any additional switch transistors. Further, 180 degrees phase jumps should be reduced (substantially avoided).

These potential benefits can be achieved by the embodiments of the disclosure.

In particular, embodiments of the disclosure use transducer elements (e.g., MUTs) having unipolar force direction to improve the phase delay map of the array.

The disclosure provides a phased array ultrasound device, comprising: a plurality of transducer elements arranged in a two dimensional (2D) array; a plurality of first electrodes, each first electrode extending along a first direction; and a plurality of second electrodes, each second electrode extending along a second direction; wherein each transducer element is associated with one first electrode and one second electrode; wherein each transducer element comprises a material located between its associated first electrode and second electrode, and is configured to emit an ultrasonic wave induced by a vibration force or an oscillation force of its material when the transducer element is actuated based on control signals applied to its associated first electrode and second electrode; wherein each transducer element has a unipolar actuation force direction; and wherein the phased array ultrasound device is configured to create a pressure focus point above or below the 2D array by actuating a set of transducer elements to form a combined ultrasonic wave.

Each first electrode may extend below the 2D array, and each second electrode may extend above the 2D array, or vice versa. The phased array ultrasound device may be used, for example, for providing a haptic feedback. To this end, it may be implemented into an electronic device, like a smartphone.

The phased array ultrasound device may have the potential advantage of obtaining an improved (e.g., the maximum possible) pressure at a given focus point (for example, without requiring any extra transistors in the array compared to the phased array ultrasound device 110), and with a dramatically reduced number of connections (compared to full individual actuation done in the conventional devices).

In particular, the phased array ultrasound device may address the problem of 180 degree phase jumps as occurs in the phased array ultrasound apparatus 110. Notably, by decreasing (e.g., eliminating) the 180 degrees phase jumps, the phased array ultrasound device may increase the pressure available at the pressure focus point.

The phased array ultrasound device may thus provide an improved pressure at the focus points. Moreover, instead of adding transistors to every actuator (in order to deal with the 180 degrees phase jumps) a specific row-column driving combined with the unipolar-actuated transducer elements is used in the phased array ultrasound device.

In some embodiments, the material may be based on a vibrating material, for example, a piezoelectric material may be used for providing a piezoelectric actuation.

In some embodiments, the material may be, for example, a capacitive material (for example, it may be just a vacuum). Moreover, an electrostatic force may create an oscillating force in the phased array ultrasound device.

Furthermore, each transducer element can have a unipolar actuation force direction. This may have the advantage of controlling (e.g., reducing, eliminating, etc.) the 180 degrees phase jumps.

The transducer elements can include Micromachined Ultrasonic Transducers (MUTs), each MUT having a unipolar actuation force direction.

This can alleviate the issue of the 180 degrees phase jumps, and an improved pressure at the pressure focus point may be obtained.

The transducer elements can include piezoelectric transducer elements, in particular piezoelectric MUTs (PMUTs), with the material comprising a PZT ferroelectric piezo material, which shows a butterfly unipolar deflection-actuation curve.

In particular, using a PZT ferroelectric piezo material, which shows a butterfly unipolar deflection-actuation curve, may provide the advantage of controlling (e.g., reducing) phase jumps, and as a consequence the available pressure at the focus point may be improved.

The transducer elements can include capacitive transducer elements, in particular capacitive MUTS, (CMUTs), with the material including a capacitive material. The phased array ultrasound device can be configured to actuate each transducer element by applying an AC voltage without DC bias, as the control signals, to its associated first electrode and second electrode.

For example, the actuation of the CMUTs may arise from an electrostatic force between two electrically actuated electrodes. Moreover, by using a purely AC voltage, the electrostatic force is intrinsically nonlinear since it is proportional to the square of the applied voltage.

In a further implementation, the AC voltage is applied with a predetermined frequency, in order to induce an electrostatic force of the capacitive material.

In a further implementation, each transducer element has an actuation force that is proportional to a square of the applied AC voltage.

In particular, when only an AC voltage V is applied to the CMUT, the force is proportional to a square of the applied AC voltage. It is therefore always in the same direction, no matter the sign of the applied voltage.

In a further implementation, the phased array ultrasound device is configured to obtain position information corresponding to a desired pressure focus point to be created; determine a combined ultrasonic wave based on the position information, which can be required for creating the desired pressure focus point; and determine the set of transducer elements to be actuated according to the combined ultrasonic wave.

In a further implementation, each first electrode connects a row of transducer elements in the 2D array and/or each second electrode connects a column of transducer elements in the 2D array.

In a further implementation, the phased array ultrasound device is further configured to apply, to a given first electrode, a first control signal having a first phase delay, in order to actuate the transducer elements associated with the given first electrode according to the first phase delay.

In a further implementation, the phased array ultrasound device is further configured to apply, to a given second electrode, a second control signal having a second phase delay, in order to actuate the transducer elements associated with the given second electrode according to the second phase delay.

In a further implementation, a total number of electrodes in the phased array ultrasound device is equal to a number of rows plus a number of columns in the 2D array.

Arranging the electrodes in such a configuration has the potential advantage that it is not required to actuate individually every single transducer element. The actuation typically only requires a number of connections which is equal to the number of rows plus the number of columns in the array, instead of requiring the product of the two.

Another example includes an electronic device, comprising a display; and a phased array ultrasound device according to the first aspect or one of the implementation form of the first aspect; wherein the phased array ultrasound device is arranged in or below the display, and is configured to create a pressure focus point above the display.

The electronic device may be, for example, a smartphone, a tablet, a display, or a personal computer, etc. Moreover, the phased array ultrasound device may be used for creating the pressure focus point, e.g., for providing haptic feedback (feeling virtual objects due to the focused pressure beams).

For example, the electronic device may be a smartphone. Moreover, it may be possible to feel the smartphone buttons one centimeter above the screen by adding an extra PMUT array layer on the smartphone.

Another aspect of the disclosure provides a method of operating the phased array ultrasound device, wherein the method comprises determining a combined ultrasonic wave, which can be required for creating a certain pressure focus point above or below the 2D array; determining, for a set of transducer elements in the 2D array, control signals for creating the determined combined ultrasonic wave with the set of transducer elements; and creating the certain pressure focus point by actuating the set of transducer elements by applying the determined control signals to the first electrodes and second electrodes associated with the set of transducer elements.

In an implementation, the method further comprises obtaining position information corresponding to the certain pressure focus point to be created; and determining the combined ultrasonic wave based on the position information.

Another aspect of the disclosure provides a computer program which, when executed by a computer, causes any of the methods described hereinto be performed.

BRIEF DESCRIPTION OF THE FIGURES

The above, as well as additional, features will be better understood through the following illustrative and non-limiting detailed description of example embodiments, with reference to the appended drawings.

The above described aspects and implementations are explained in the following description of embodiments with respect to the enclosed drawings:

FIG. 11A is a diagram illustrating a force across PMUTs of transducer elements in an array for forming a desired combined ultrasound wave, according to an embodiment.

FIG. 11B is a diagram illustrating differences between phase delays, according to an embodiment.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Figure 1:
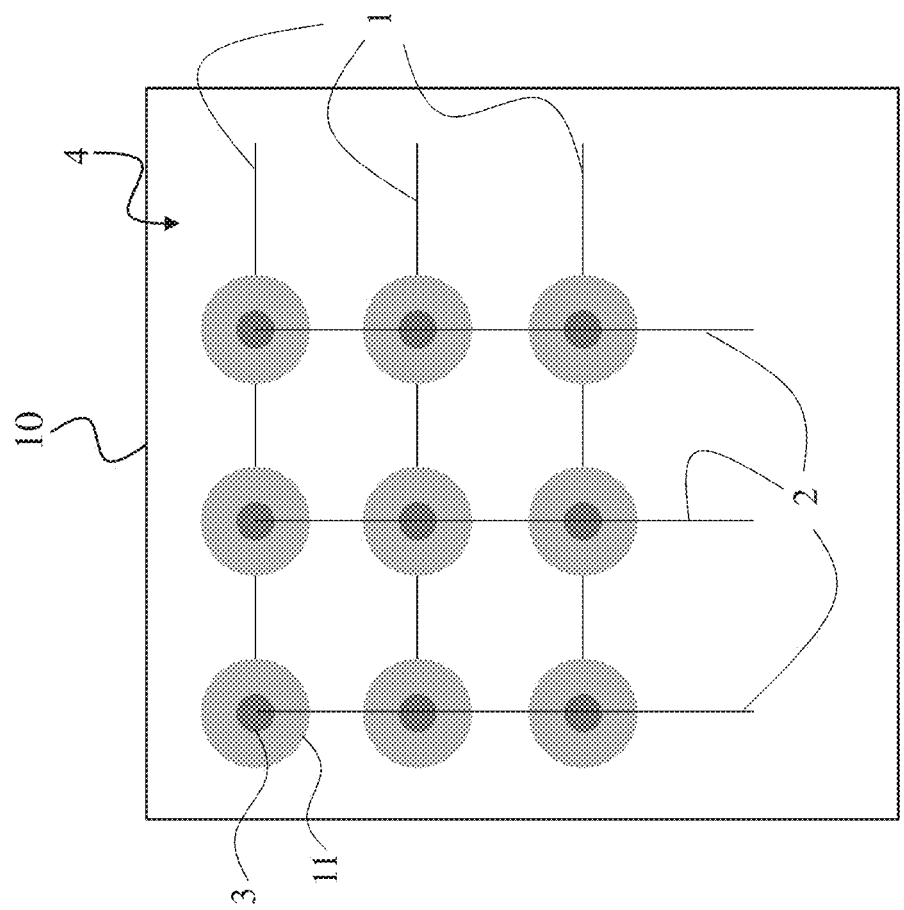
FIG. 1 is a schematic view of a phased array ultrasound device, according to an embodiment.

FIG. 1 shows a phased array ultrasound device 10, according to an embodiment of the disclosure.

The phased array ultrasound device 10 comprises a plurality of transducer elements 11 arranged in a two dimensional (2D) array 4. Further, it comprises a plurality of first electrodes 1, each first electrode 1 extending along a first direction, and, for example, below the 2D array 4. Further, it comprises a plurality of second electrodes 2, each second electrode 2 extending along a second direction, and, for example, above the 2D array 4.

Each transducer element 11 (of the phased array ultrasound device 10) is associated with one first electrode 1 and one second electrode 2. Furthermore, each transducer element 11 comprises a material 3, which is located between its associated first electrode 1 and second electrode 2. Each transducer element 11 is configured to emit an ultrasonic wave induced by a vibration force or an oscillation force of its material 3, when the transducer element 11 is actuated based on control signals applied to its associated first electrode 1 and second electrode 2. Furthermore, each transducer element 11 has a unipolar actuation force direction.

Moreover, the phased array ultrasound device 10 is configured to create a pressure focus point above or below the 2D array 4, by actuating a set of transducer elements 11 to form a combined ultrasonic wave.

The phased array ultrasound device 10 may use an array of MUTs as the transducer elements 11, in which each MUT has a unipolar force direction. The phased array ultrasound device 10 can improve the phase delay map of the array, without adding any extra switch transistors in the array.

The material may be based on a vibrating material, for example, a piezoelectric material, which may be used for providing a piezoelectric actuation, or it may be a capacitive material (for example, it may be just a vacuum) and an electrostatic force may create an oscillating force in the phased array ultrasound device.

The phased array ultrasound device 10 can help address the problem of 180 degree phase jumps, which occur in the conventional devices. The phased array ultrasound device 10 may thus provide an improved (higher) pressure at the pressure focus point.

Figure 2:
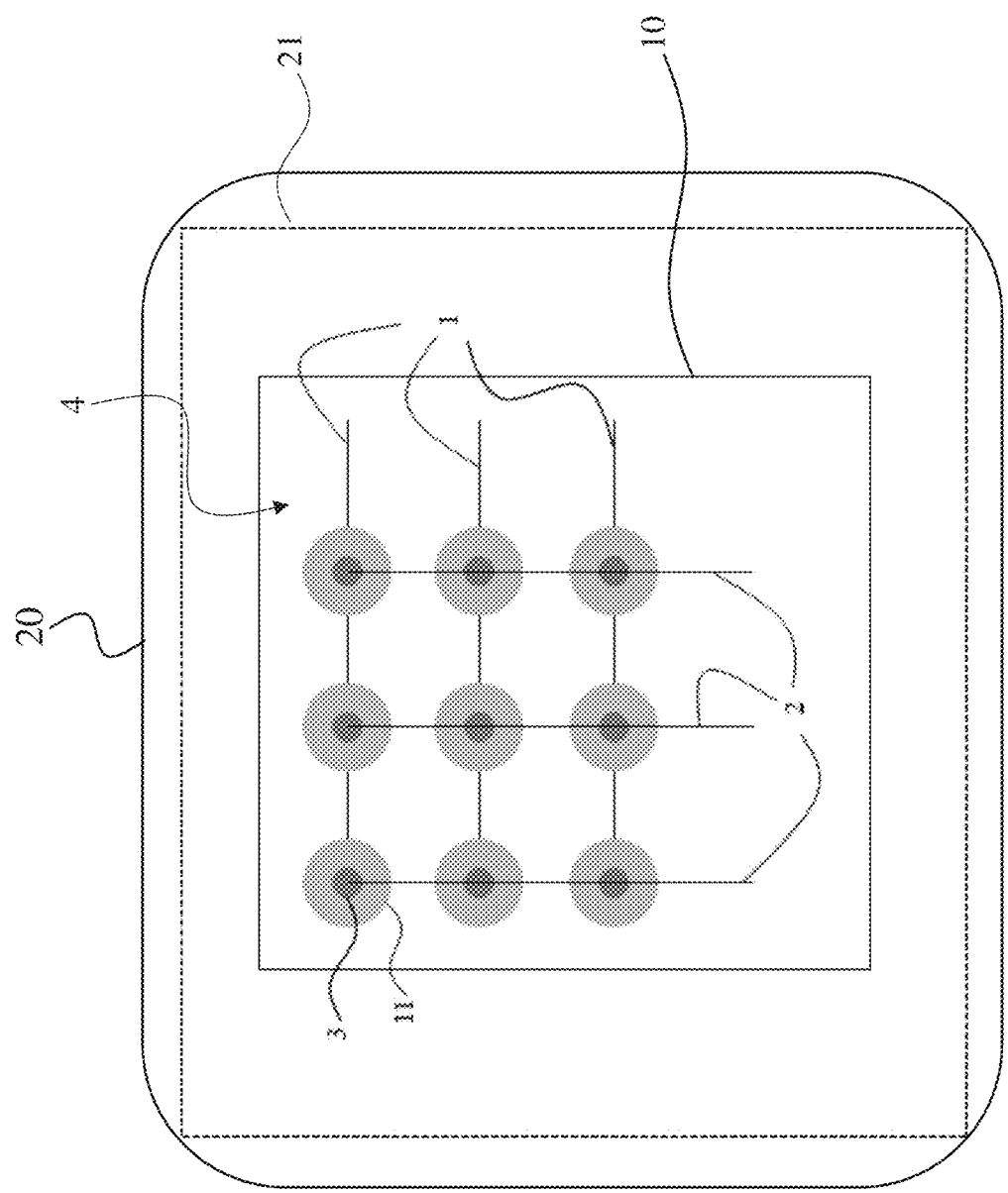
FIG. 2 is a schematic view of an electronic device, according to an embodiment.

Reference is now made to FIG. 2, which shows an electronic device 20, according to an embodiment of the disclosure.

The electronic device 20 comprises a display 21 and a phased array ultrasound device 10. The electronic device 20 may be, for example, a smartphone. The phased array ultrasound device 10 of the electronic device 20 is arranged in or below the display 21, and is configured to create a pressure focus point above the display 21.

For example, the phased array ultrasound device 10 may comprise a plurality of transducer elements 11, which are arranged in a 2D array 4; a plurality of first electrodes 1, each first electrode 1 extending along a first direction, and, for example, above the 2D array 4; and a plurality of second electrodes 2, each second electrode 2 extending along a second direction, and, for example, below the 2D array 4.

Furthermore, each transducer element 11 of the phased array ultrasound device 10 of the electronic device 20 may be associated with one first electrode 1 and one second electrode 2. Each transducer element 11 comprises a material 3 located between its associated first electrode 1 and second electrode 2, and is configured to emit an ultrasonic wave induced by a vibration force or an oscillation force of its material, when the transducer element 11 is actuated based on control signals applied to its associated first electrode 1 and second electrode 2. Each transducer element 11 has a unipolar actuation force direction.

Moreover, the phased array ultrasound device 10 of the electronic device 20 may be configured to create a pressure focus point above or below the 2D array 4, by actuating a set of transducer elements 11 to form a combined ultrasonic wave.

The electronic device 20 may be configured to provide haptic feedback (e.g., by using the phased array ultrasound device 10).

In some embodiments, the above mentioned driving scheme may be used (e.g., for the phased array ultrasound device 10) in combination with arrays of transducer elements 11, in which each transducer element 11 has the unipolar force direction (as opposed to the bipolar force direction of the PMUT array described above, where the force on the PMUT membrane could be pointing upwards AND downwards).

Moreover, it may be possible to improve the phase delay map of the array, without adding any extra switch transistors to the array.

Examples of MUTs having a unipolar force direction are PMUTs with, e.g., a PZT ferroelectric piezo material and capacitive micromachined ultrasonic transducers (CMUTs).

For example, in some embodiments, the transducer elements 11 of the phased array ultrasound device 10 may comprise piezoelectric transducer elements, in particular piezoelectric MUTs (PMUTs); and the material 3 may comprise a PZT ferroelectric piezo material, which generally shows a butterfly unipolar deflection-actuation curve.

Figure 3:
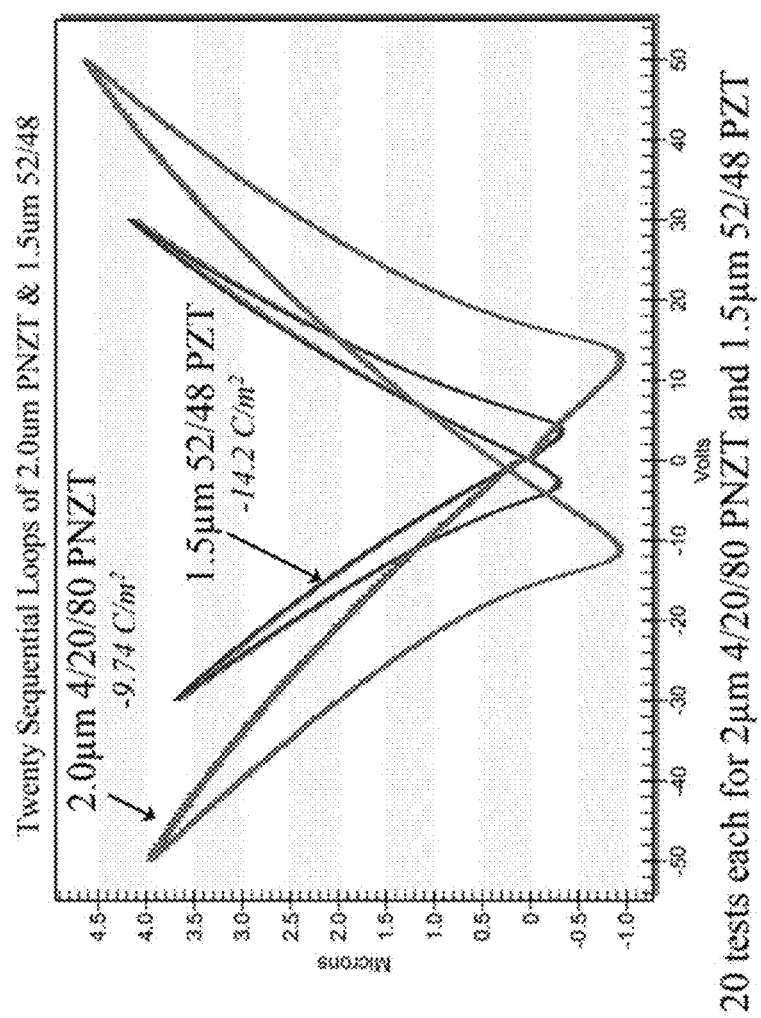
FIG. 3 is a diagram illustrating the butterfly unipolar deflection-actuation curve of a PZT, according to an embodiment.

FIG. 3 is a diagram illustrating the butterfly unipolar deflection-actuation curve of a PZT. The PZT may be used by the phased array ultrasound device 10.

Moreover, in some embodiments, the transducer elements 11 of the phased array ultrasound device 10 may comprise capacitive transducer elements, in particular capacitive (CMUTs).

For example, the material 3 may comprise a capacitive material, and the phased array ultrasound device 10 may be configured to actuate each transducer element 11 by applying an AC voltage without DC bias, as the control signals, to its associated first electrode 1 and second electrode 2.

The actuation of the CMUTs may arise from an electrostatic force between two electrically actuated electrodes. While the CMUT driving force is typically made artificially "bipolar" by adding a constant DC bias voltage, the electrostatic force is intrinsically nonlinear since it is proportional to the square of the applied voltage. However, when only an AC voltage V is applied to the CMUT (of the phased array ultrasound device 10) the force is proportional to $V^2$. It is therefore generally in the same direction no matter the sign of V.

For instance, the actuation force and driving phase in the 36×36 array example is affected by the square term of the CMUT electrostatic force. This test case is selected for ease of mathematical computation since the absolute value operator otherwise required for the PZT PMUT is not as simple to evaluate in a few equations.

If the 36×36 array described above comprises CMUTs with only an AC actuation (no DC bias), then each CMUT would generally be subject to an electrostatic driving force proportional to $V^2$, that is (the proportionality constant is disregarded as it only depends on geometrical/material parameters), according to Eq. (2):

$$F = \left(2V_0\cos\left(2\pi f_0 t + \frac{1}{2}(\phi_R + \phi_C)\right) \cdot \sin\left(\frac{1}{2}(\phi_R - \phi_C)\right)\right)^2 \quad \text{Eq. (2)}$$

which can be mathematically developed according to Eq. (3):

$$F = 4V_0^2\cos^2\left(2\pi f_0 t + \frac{1}{2}(\phi_R + \phi_C)\right) \cdot \sin^2\left(\frac{1}{2}(\phi_R - \phi_C)\right) \quad \text{Eq. (3)}$$

Thus, using a simple trigonometry technique, the Eq. (4) can be derived:

$$F = 4V_0^2\left(\frac{1}{2} + \frac{1}{2}\cos\left(4\pi f_0 t + \frac{2}{2}(\phi_R + \phi_C)\right)\right) \cdot \sin^2\left(\frac{1}{2}(\phi_R - \phi_C)\right) \quad \text{Eq. (4)}$$

A constant (static) force term is provided plus a harmonic electric force at double the electric actuation frequency and with a now doubled phase delay. Moreover, in order to still obtain the CMUT membrane resonance frequency, the driving method mentioned above can be (slightly) adapted, i.e., the electric actuation frequency may be halved. Also, the phase delays may be halved as well in order to guarantee the improved or optimal phase delays on the central row and column.

By using the above configuration of the phased array ultrasound device 10, the problem of the 180 degree phase jumps in the above equation can be overcome, since the cause of it (i.e., the sine term that was inverting its sign) is now squared and thus is always positive. With the described driving technique on the 36×36 CMUT array the phase delay map is updated, as it is illustrated in FIG. 4A and FIG. 4B.

Figures 4A, 4B:
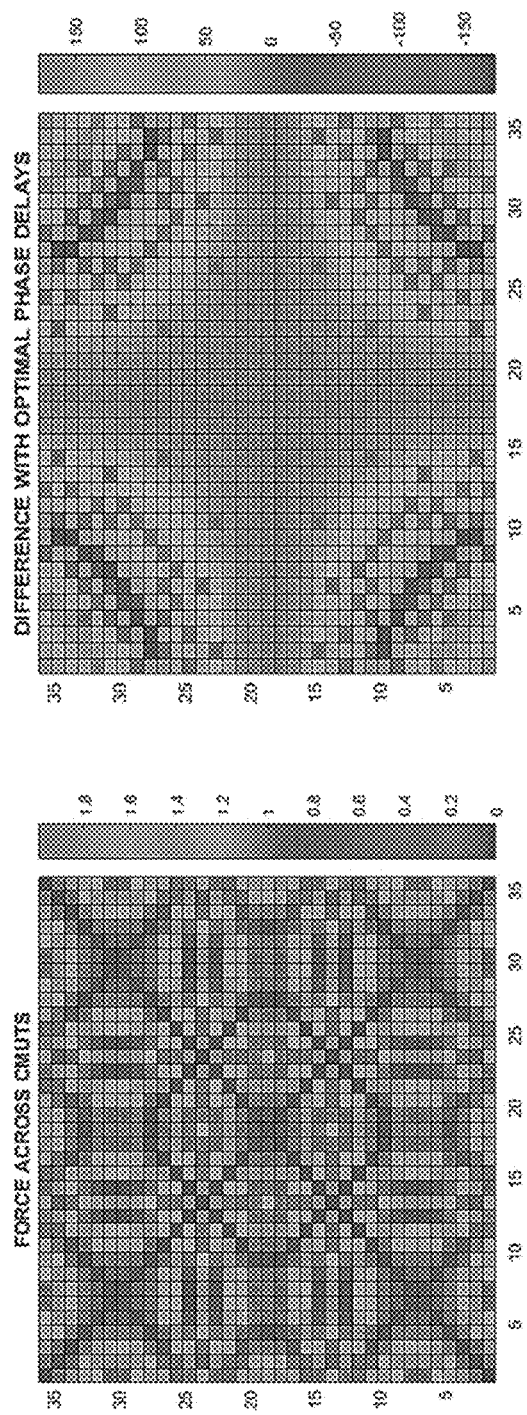
FIG. 4A is a diagram illustrating a force across CMUTs of transducer elements in an array for forming a desired combined ultrasound wave, according to an embodiment.
FIG. 4B is a diagram illustrating differences between phase delays, according to an embodiment.

Reference is now made to FIG. 4A and FIG. 4B, which show a diagram illustrating force across CMUTs of transducer elements 11 in an array for forming a desired combined ultrasound wave (FIG. 4A), and a diagram illustrating differences between phase delays (FIG. 4B).

It can be derived from FIG. 4A and FIG. 4B that the phased array ultrasound device 10 can (e.g., dramatically) improve and smooth the phase (delay) map, which may potentially lead to an easier driving for creating haptic pressure patterns. Since the phase is closer to optimal, one can also expect higher output pressures. The force applied to each CMUT is shown in FIG. 4A.

Figures 12A, 12B:
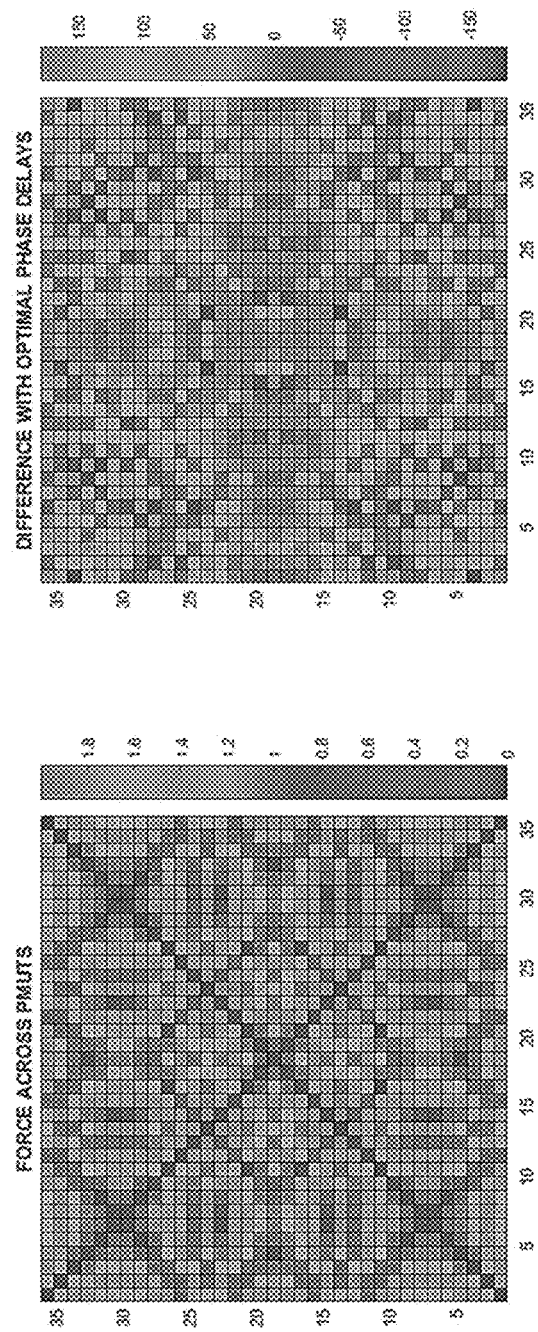
FIG. 12A is a schematic view of an arrangement of electrodes of the phased array ultrasound device, according to an embodiment.
FIG. 12B is a schematic view of an arrangement of electrodes of the phased array ultrasound device, according to an embodiment.

Furthermore, in the case of the unipolar PZT (PMUT) array being used in the phased array ultrasound device 10, the phase map would be according to FIG. 4B but the force on each PMUT would still have the same magnitude as the one shown before (FIG. 12B).

Figure 5:
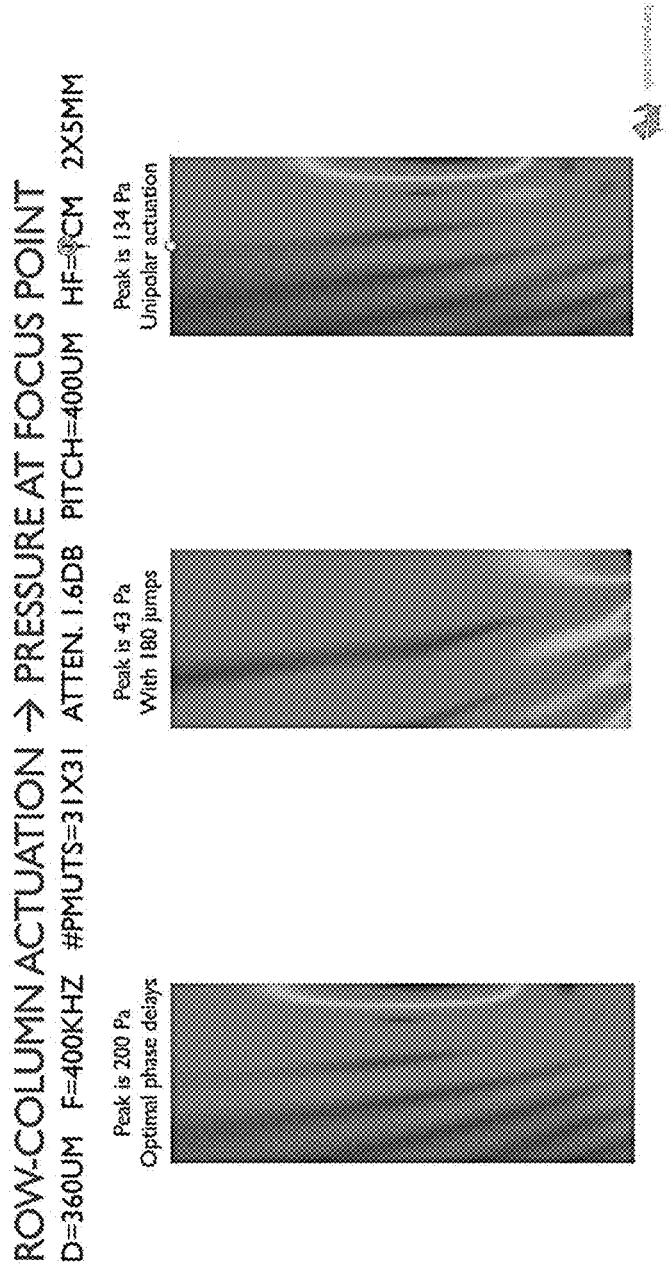
FIG. 5 shows a simulation result performed on the pressure focusing of a large array of PMUTs with and without unipolar actuation, according to an embodiment.

Furthermore, simulations performed on the pressure focusing of a large array of PMUTs with and without unipolar actuation are shown in FIG. 5.

As it can be derived from FIG. 5, when the proposed driving scheme is applied to bipolar driven PMUTs, the pressure drops to less than 25% at the focus point (and the focusing does not work correctly anymore). When the technique is used with a unipolar driven PMUT array (e.g., peak voltage across PMUTs is kept below 1× the driving voltage and the factor 2 voltage increase is scaled down) to be comparable to the optimally-driven PMUT array then the pressure at the focus point is 67% of the pressure created by an optimally driven PMUT array.

Figure 6:
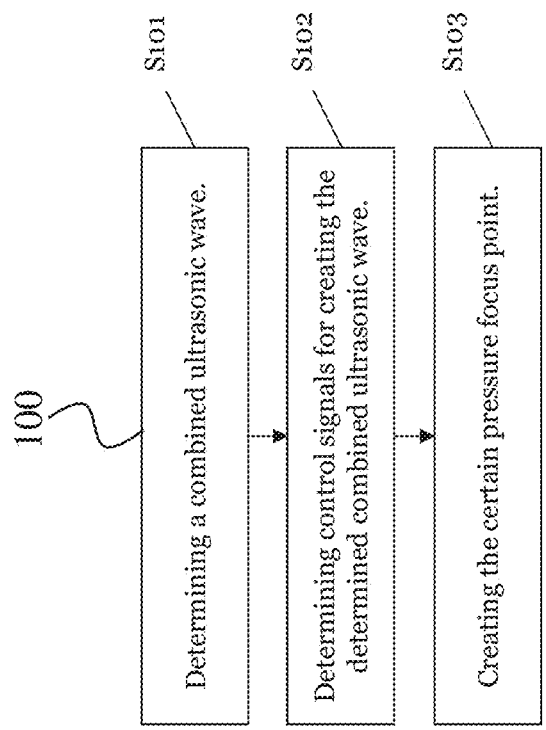
FIG. 6 is a flowchart of a method for operating a phased array ultrasound device, according to an embodiment.
Figure 7:
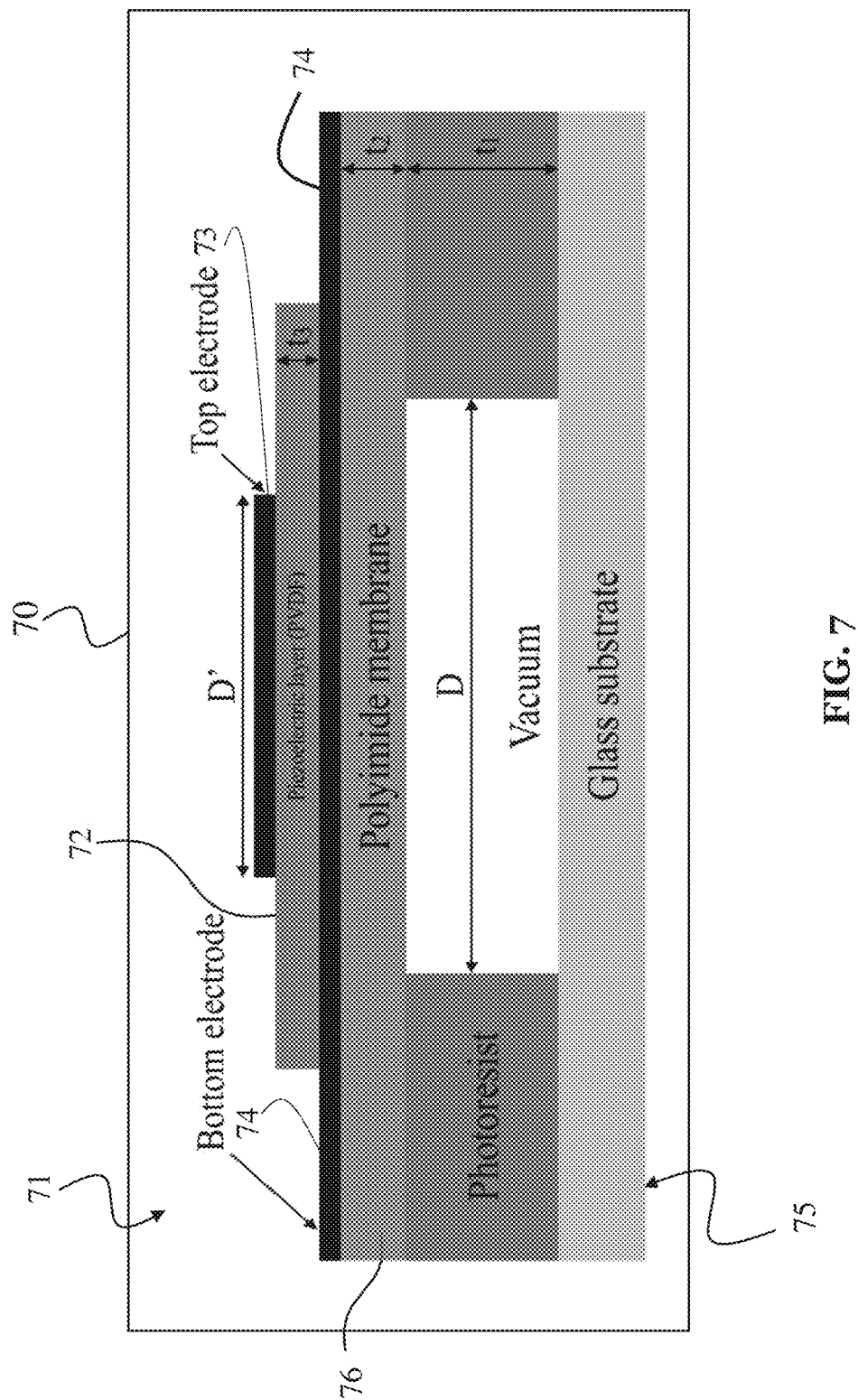
FIG. 7 is a schematic view of a conventional PMUT, according to an embodiment.
Figure 8:
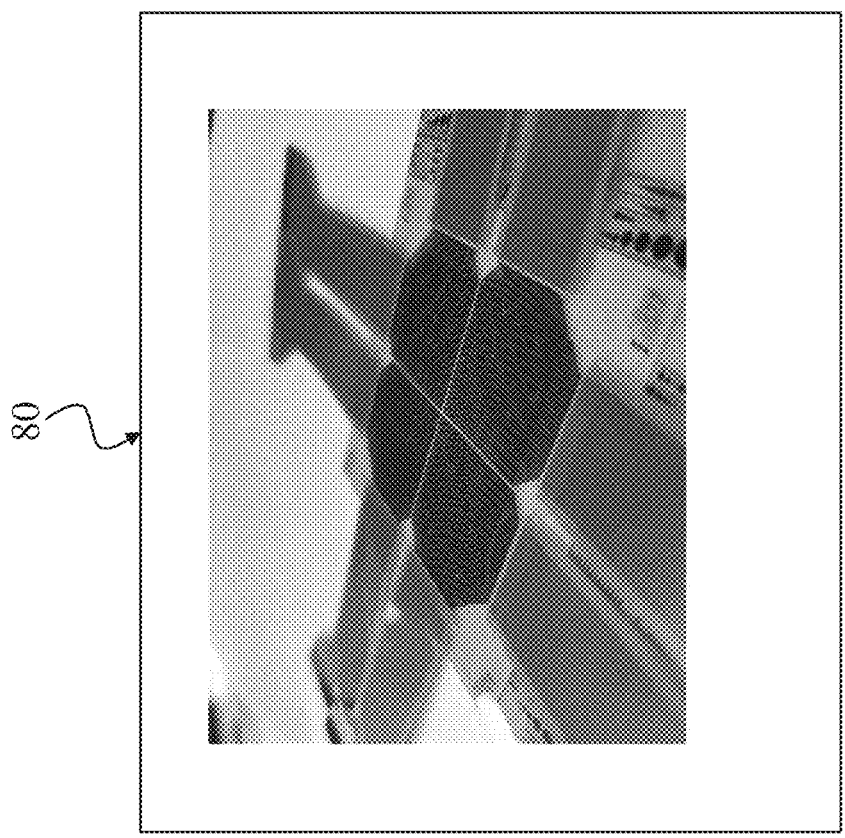
FIG. 8 is an image of a fabricated 64×64 array of PMUTs, according to an embodiment.
Figure 9:
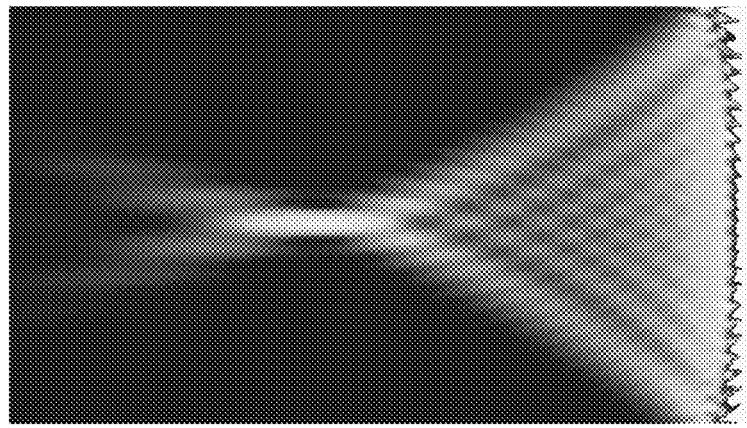
FIG. 9 is a diagram illustrating the creation of a focusing point using the MUTs, according to an embodiment.
Figure 10:
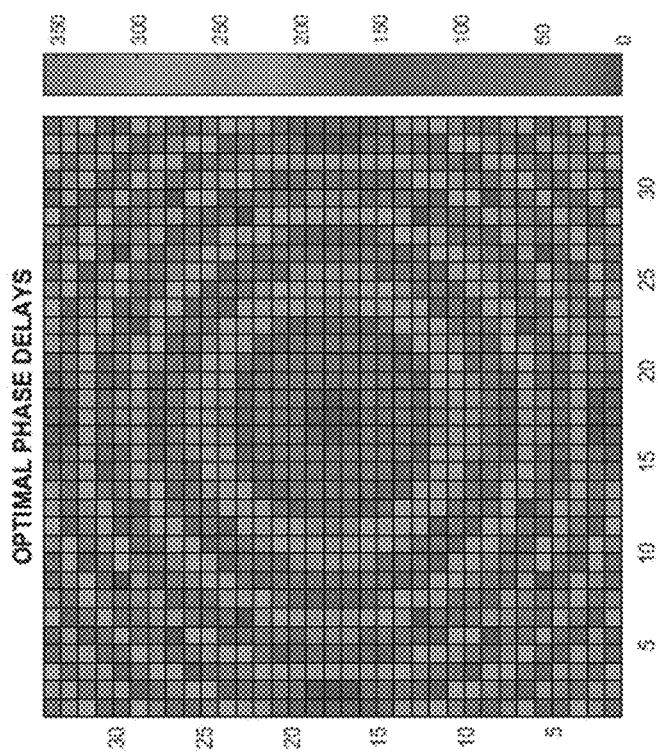
FIG. 10 is a diagram illustrating the delay that is applied to every individual MUT of a 32×32 MUT array for obtaining the highest pressure at the focus point, according to an embodiment.

FIG. 6 shows a method 100 according to an embodiment for operating a phased array ultrasound device 10.

The method 100 may be carried out by the phased array ultrasound device 10 and/or the electronic device 20, as described above.

The method 100 comprises a step S101 of determining a combined ultrasonic wave, which can create a certain pressure focus point above or below the 2D array.

The method 100 further comprises a step S102 of determining, for a set of transducer elements in the 2D array, control signals for creating the determined combined ultrasonic wave with the set of transducer elements.

The method 100 further comprises a step S103 of creating the certain pressure focus point by actuating the set of transducer elements by applying the determined control signals to the first electrodes and second electrodes associated with the set of transducer elements.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A phased array ultrasound device comprising:
   a first plurality of electrodes each extending along a first direction;
   a second plurality of electrodes each extending along a second direction;
   a plurality of transducer elements arranged into rows of transducer elements and columns of transducer elements, wherein each of the rows of transducer elements is connected to an electrode of the first plurality of electrodes and each of the columns of transducer elements is connected to an electrode of the plurality of second electrodes; and
   an actuator configured to provide:
      a first control signal to a first electrode of the first plurality of electrodes,
      additional first control signals to second electrodes of the first plurality of electrodes, wherein the first control signal is phase delayed with respect to the additional first control signals,
      a second control signal to a first electrode of the second plurality of electrodes, and
      additional second control signals to second electrodes of the second plurality of electrodes, wherein the second control signal is phase delayed with respect to the additional second control signals,
      thereby generating a combined ultrasonic wave that originates from a transducer element of the plurality of transducer elements that corresponds to the first electrode and the second electrode, wherein the plurality of transducer elements each comprise a ferroelectric material.

2. The phased array ultrasound device according to claim 1, wherein the plurality of transducer elements each have a unipolar actuation force direction.

3. The phased array ultrasound device according to claim 1, wherein the plurality of transducer elements comprises micromachined ultrasonic transducers.

4. The phased array ultrasound device according to claim 1, wherein the plurality of transducer elements comprises piezoelectric transducer elements.

5. The phased array ultrasound device according to claim 1, wherein:
   the plurality of transducer elements comprises capacitive transducer elements, and
   the phased array ultrasound device is configured to actuate each transducer element of the plurality of transducer elements by applying an AC voltage without DC bias, as control signals, to the first plurality of electrodes and the second plurality of electrodes.

6. The phased array ultrasound device according to claim 5, wherein the AC voltage is configured to induce an electrostatic force on the transducer element.

7. The phased array ultrasound device according to claim 5, wherein each transducer element of the plurality of transducer elements has an actuation force that is proportional to a square of the AC voltage.

8. The phased array ultrasound device according to claim 1, wherein the phased array ultrasound device is further configured to:
   obtain position information corresponding to a desired pressure focus point to be created;
   determine the combined ultrasonic wave based on the position information that corresponds to creating the desired pressure focus point; and
   determine a set of transducer elements to be actuated according to the combined ultrasonic wave.

9. The phased array ultrasound device according to claim 1, wherein each electrode of the first plurality of electrodes connects a row of transducer elements of the plurality of transducer elements and each electrode of the second plurality of electrodes connects a column of the plurality of transducer elements.

10. The phased array ultrasound device according to claim 1 wherein a total number of electrodes in the phased array ultrasound device is equal to a number of rows plus a number of columns in the phased array ultrasound device.

11. The phased array ultrasound device according to claim 1, wherein each transducer element of the plurality of transducer elements comprises a material located between the first plurality of electrodes and the second plurality of electrodes.

12. The phased array ultrasound device according to claim 1, wherein the phased array ultrasound device is configured to create a pressure focus point above or below the phased array ultrasound device by actuating a set of transducer elements of the plurality of transducer elements to form an ultrasonic wave.

13. The phased array ultrasound device of claim 1, further comprising:
a display, wherein the plurality of transducer elements is arranged in or below the display and is configured to create a pressure focus point above the display.

14. A method comprising:
determining a combined ultrasonic wave which corresponds to a pressure focus point above or below a phased array ultrasound device that includes a first plurality of electrodes each extending along a first direction and a second plurality of electrodes each extending along a second direction;
determining, for a plurality of transducer elements in the phased array ultrasound device, control signals for creating the combined ultrasonic wave with the plurality of transducer elements, wherein the plurality of transducer elements are arranged into rows of transducer elements and columns of transducer elements, wherein each of the rows of transducer elements is connected to an electrode of the first plurality of electrodes and each of the columns of transducer elements is connected to an electrode of the second plurality of electrodes; and
creating, via a unipolar actuation force at each transducer element of the plurality, the pressure focus point by actuating the plurality of transducer elements by applying control signals to the first plurality of electrodes and the second plurality of electrodes associated with the plurality of transducer elements,
wherein applying the control signals comprises providing:
a first control signal to a first electrode of the first plurality of electrodes,
additional first control signals to second electrodes of the first plurality of electrodes, wherein the first control signal is phase delayed with respect to the additional first control signals,
a second control signal to a first electrode of the second plurality of electrodes, and
additional second control signals to second electrodes of the second plurality of electrodes, wherein the second control signal is phase delayed with respect to the additional second control signals,
thereby generating the combined ultrasonic wave that originates from a transducer element of the plurality of transducer elements that corresponds to the first electrode and the second electrode.

15. The method according to claim 14, further comprising:
obtaining position information corresponding to the pressure focus point to be created; and
determining the combined ultrasonic wave based on the position information.

16. The phased array ultrasound device of claim 1, wherein the ferroelectric material comprises lead zirconate titanate (PZT).

17. The method of claim 14, wherein the control signals include an AC signal with no DC bias.

18. The method of claim 14, wherein the plurality of transducer elements each include a ferroelectric material.

* * * * *